Sept. 21, 1954     A. H. MOREY     2,689,536
CAB STRUCTURE
Filed Dec. 1, 1950     2 Sheets-Sheet 1
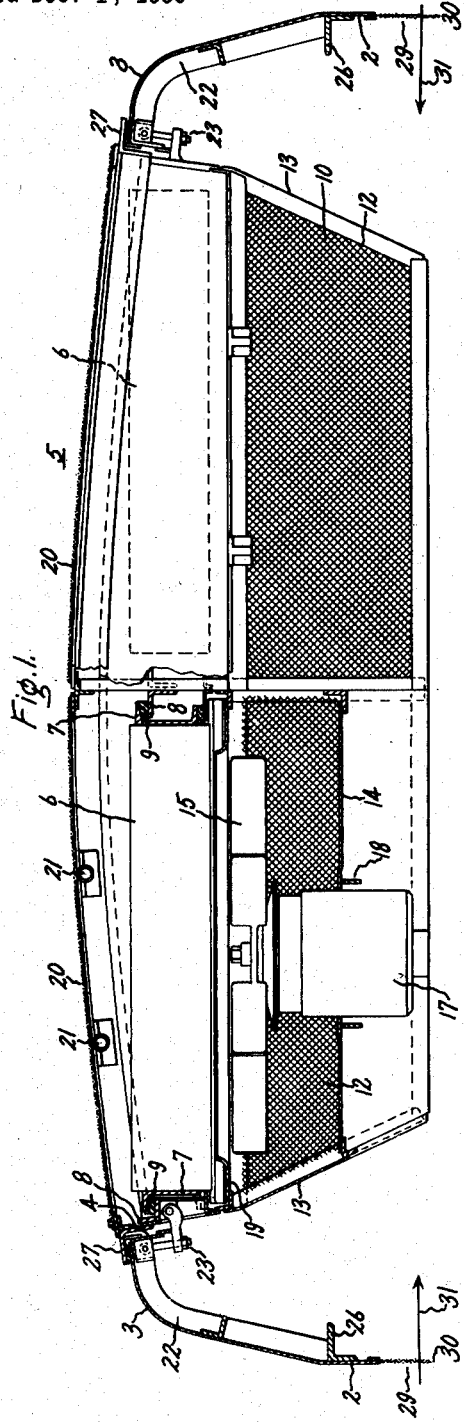
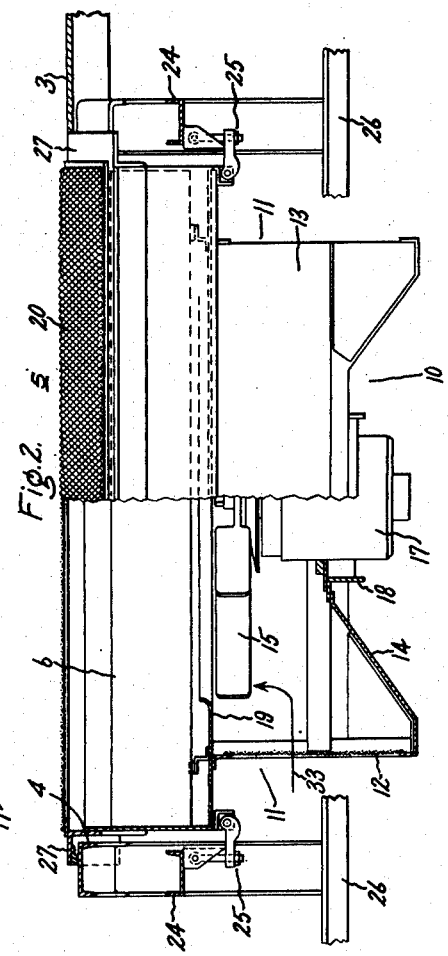
Inventor:
Arthur H. Morey,
by Ernest C. Britton
His Attorney.

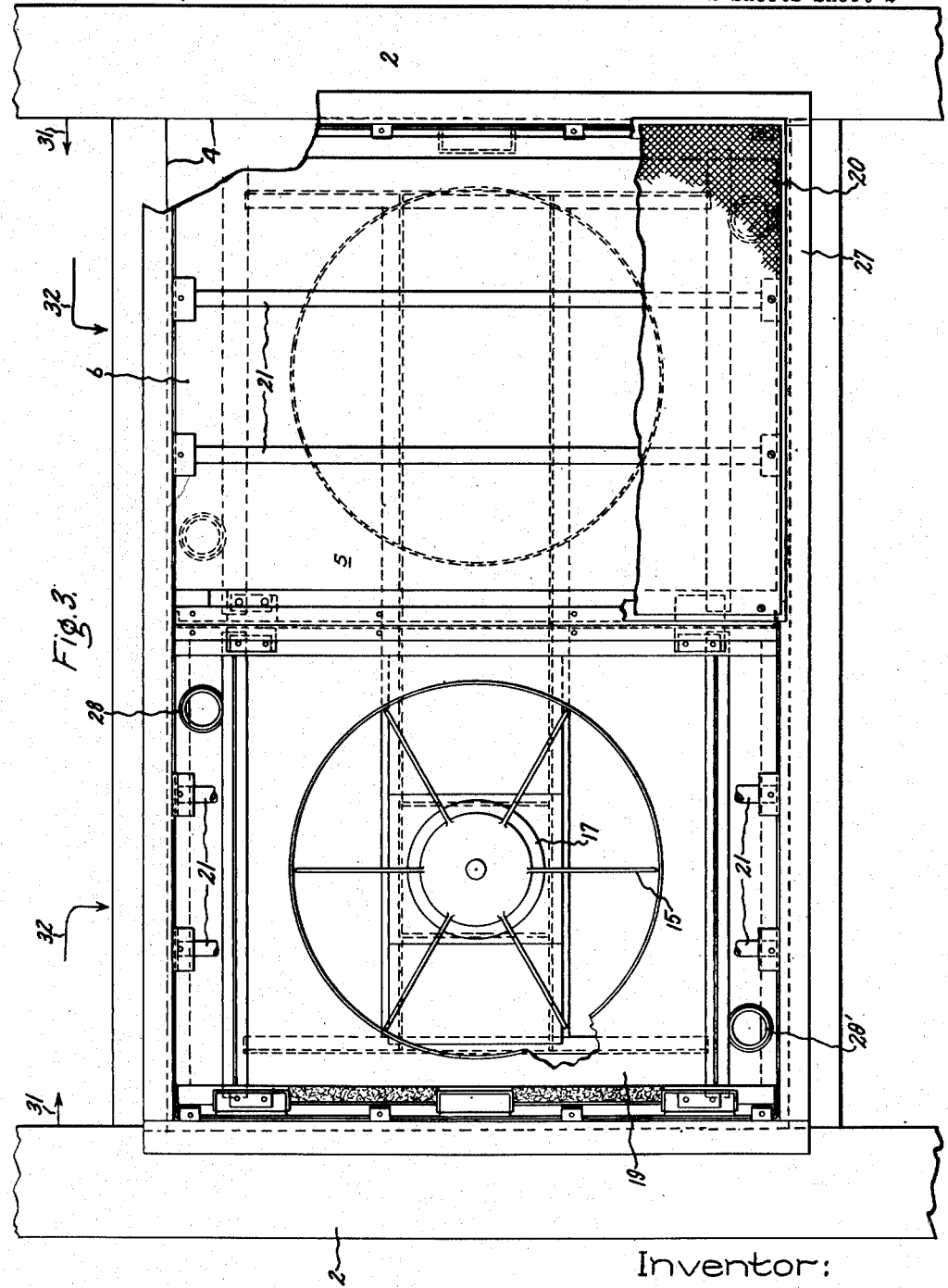

Patented Sept. 21, 1954

2,689,536

UNITED STATES PATENT OFFICE 2,689,536

CAB STRUCTURE

Arthur H. Morey, Erie, Pa., assignor to General Electric Company, a corporation of New York Application December 1, 1950, Serial No. 198,540

4 Claims. (Cl. 105—62)

1

This invention relates to cab structures for vehicles and more particularly to the cabs of rail vehicles such as locomotives in which a radiator is arranged.

In the design of cab structures for locomotives having an internal combustion engine as a prime mover, radiators must frequently be provided for either cooling a fluid used to abstract heat from the cylinder walls or for cooling lubricating oil. These radiators are ordinarily located within the overall confines of the cab and a fan is associated therewith for blowing air thereover. In many designs, the fan draws air from inside the cab and suitable openings are provided in the walls of the cab to admit air from the exterior of the locomotive. Since in many cases it is important that the flow of air through the radiator be at a constant rate which is not affected by the velocity, direction, or the pressure of the air on the exterior of the locomotive, louvers and louver operating mechanisms are customarily provided for controlling the air flow through the radiators. It is desirable however to provide an arrangement in which the flow of air through the radiators can be controlled entirely independently of the air pressure and velocity outside of the locomotive without the use of louvers and complicated louver operating devices.

An object of this invention is to provide an improved cab structure for a vehicle.

Another object of this invention is to provide an improved radiator cooling arrangement for a vehicle.

A further object of this invention is to provide an improved cab construction for a vehicle having a radiator mounted therein wherein the flow of air through the radiator is independent of the direction, velocity or pressure of the air on the outside of the cab.

Further objects and advantages of this invention will become apparent and the invention will be better understood by reference to the following description and the accompanying drawing and the features of novelty which characterize this invention will be pointed out with particularity in the claims annexed to and forming a part of the specification.

In accordance with this invention, there is provided a cab structure comprising side walls and a roof having an opening formed therein for discharging air from the inside of the cab. A radiator is arranged in the opening or directly below it and a longitudinal air passage member arranged directly below the radiator extending substantially longitudinally across the cab. The air passage member has its longitudinal ends open to the interior of the cab and a fan is mounted therein directly below the radiator. Each of the side walls of the cab is provided with an opening, in which an air filter may be arranged, communicating with the interior of the cab for admitting air thereto. The side wall openings define a transverse air passage from one side of the cab to the other. Thus, the wind pressure on the exterior of the cab is equalized across the cab between the side wall openings and the air entering the cab must make a right angle turn to enter the passage member and another right angle turn to enter the fan. In this way, the amount of air blown through the radiator by the fan is entirely under the control of the fan and is independent of the wind pressure on the exterior of the cab.

In the drawing, Fig. 1 is an end elevational view, partly in section showing a part of a rail vehicle cab provided with the improved construction of this invention; Fig. 2 is a side elevational view, partly in section, further illustrating the improved construction of Fig. 1; and Fig. 3 is a top plan view partly in section, showing the construction of Figs. 1 and 2.

Referring now to Figs. 1, 2 and 3, there is shown a cab having substantially parallel side walls 2 and a roof 3. The roof 3 is provided with an opening 4 therein in which a radiator and fan unit assembly 5, to be hereinafter more completely described is positioned. The radiator and fan assembly 5 includes a pair of radiators 6, only one being fully shown, it being readily apparent that this invention is equally applicable to a construction utilizing a single radiator, or a plurality of radiator segments greater than two. The radiators 6, which may be of any conventional type, are mounted in supporting members 7. The supporting members 7 in turn rest on a supporting framework 8 by means of suitable cushions 9. Arranged immediately below the radiator 6 is a longitudinal air passage member, generally identified as 10. This passage has its longitudinal ends open and communicating with the interior of the cab as at 11, these ends being covered with a suitable screening as at 12. The sides 13 and the bottom portion 14 extending in parallel spaced relation with the side walls 3 are preferably formed of imperforate plates. A fan 15 for drawing air from the passage member 10 and for blowing the air through the radiator 6 and out of the opening 4 is arranged in the air passage member 10 immediately below the radiator 6 and is driven by a suitable motor 17 which is mounted in the bottom portion 14 of the passage member 10 by suitable supports 18. A shroud member 19 is arranged intermediate the fan 15 and the radiator 6 in order to direct the air from the fan into the radiator. As shown in the drawing the shroud wall or member 19 is provided with a central opening below the radiator, and the shroud member is joined with the upper edges of the sides 13 to form a top wall for the air passage member 10. Suitable wire mesh 20 may be mounted on the supporting member 8 and supported by longitudinal supports 21.

The entire radiator and fan assembly 5 is arranged for removal from the cab through the opening 4 and is detachably secured to vertical braces 22 by means of latches 23 and to transverse supporting braces 24 by means of latches 25. It will be readily apparent that transverse braces 24 run across the cab and are supported by longitudinal braces 26. The radiator and fan assembly 5 is supported in the opening 4 by means of flange members 27 which rest on the peripheral edges of the opening 4. It will thus be readily apparent that the complete radiator and fan unit 5 can be lifted out of the roof opening 4 by merely disengaging the latches 23 and 25. Connections 28 and 28' are provided for the inlet and outlet of the radiator 6.

Air enters the cab through openings 29 respectively formed in the side walls 2. These openings may merely be covered with wire mesh, as shown at 30, or a suitable air filter, of any conventional form, may be arranged in the openings 29. The side wall openings 29 are diametrically opposite and are shown here as being arranged lower than the longitudinal air passage member 10. The openings 29, therefore, define an air passage extending across the cab from one side to the other. In operation, the fan 15 draws air through the openings 29, as shown by the arrows 31 and into the longitudinal passage member 10. However, it will be readily apparent that the air 31 is entering the cab transversely of the air passage member 10 and must therefore make a right angle turn to enter the air passage member. This is shown by arrows 32 appearing on Fig. 3. After the air has entered the longitudinal air passage 10, it must make another right angle turn to enter the fan 15, as shown by the arrow 33. The air is then blown through the radiator 6 and out of the cab through the opening 4.

It will now be readily apparent that since there is a transverse air passage between the openings 29 in the side walls 2, any change in the flow of air entering the cab through the openings 29 due to wind pressure on the sides of the locomotive will have no effect on the flow of air through the longitudinal air passage 10 and the radiator 6 since the wind pressure is free to equalize across the cab through the openings 29 on each side. This insures that the amount of air passing through the longitudinal passage 10 and the radiator 6 is entirely under the control of the radiator fan 15 and independent of the velocity or pressure of the air on the outside of the cab. It will be readily apparent that the fan 15 may be controlled in any convenient manner, for instance, responsive to the temperature of the fluid leaving the radiator. While the foregoing discloses a construction wherein the radiator and fan assembly 5 is arranged in an opening in the roof of the cab, it will be readily seen that this invention is equally applicable to a construction wherein the air is discharged through the bottom of the cab or through both the bottom and the roof.

While I have shown and described a particular embodiment of this invention, further modifications and improvements will occur to those skilled in the art. I desire it to be understood, therefore, that this invention is not limited to the particular embodiment shown and I intend in the appended claims to cover all modifications which do not depart from the spirit and scope of this invention.

What I claim as new and desire to secure by Letters Patent of the United States is:

1. A cab structure for a vehicle comprising side walls and a roof, said roof having an opening formed therein for discharging air from said cab, a cooling unit arranged in said roof opening comprising a radiator and a fan disposed below said radiator for blowing air therethrough, and means for detachably securing said unit to said cab structure whereby said unit may be removed through said roof opening, each of said walls having an opening formed therein communicating with the interior of said cab for admitting air thereto, said side wall openings defining a transverse air pressure from one side of said cab to the other whereby wind pressure is equalized across said cab so that the amount of air blown through said radiator is entirely under the control of said fan.

2. A cab structure for a vehicle comprising side walls and a roof, said roof having an opening formed therein for discharging air from said cab, a cooling unit arranged in said roof opening comprising a radiator, a longitudinal air passage member depending from said radiator and communicating with the interior of said cab, and a vertical fan arranged in said passage member below said radiator for drawing air from said passage and for blowing said air through said radiator; and means for detachably securing said unit to said cab structure whereby said unit may be removed through said roof opening, each of said side walls having an opening formed therein communicating with the interior of said cab for admitting air thereto, said side wall openings defining a transverse air passage from one side of said cab to the other whereby wind pressure is equalized across said cab and said air must make a right angle turn to enter said passage member and another right angle turn to enter said fan so that the amount of air blown through said radiator is entirely under the control of said fan.

3. A cab structure for a vehicle comprising substantially parallel cab side walls and a roof, said roof having an opening formed therein, a radiator mounted in said roof in said opening, side and bottom air passage walls mounted below said radiator extending longitudinally of said cab in substantially parallel spaced relation with said cab side walls thereby to form an open-end air passage member communicating at the top with said radiator and at each end and with the interior of said cab, each of said cab side walls being provided with an opening communicating with the interior of said cab for admitting air into said cab, and a fan mounted in said air passage member below said radiator including means for driving said fan to draw air through said cab side wall openings into said cab in a direction transversely of said air passage member and then into said air passage member in a direction at right angles to its flow through said cab side wall openings and upward through said radiator to the exterior of said cab, said cab side wall openings providing for transverse air flow through said cab for the equalization of wind pressure across said cab.

4. A cab structure for a vehicle comprising substantially parallel cab side walls and a roof, said roof having an opening formed therein, a radiator mounted in said roof in said opening, side and bottom air passage walls mounted below said radiator extending longitudinally of said cab in substantially parallel spaced relation with said cab side walls, a shroud wall below said radiator joined with the upper edges of said air passage side walls and provided with a central opening below said radiator thereby to form an open end air passage member communicating through said central opening with said radiator and at each end and with the interior of said cab, each of said cab side walls being provided with an opening communicating with the interior of said cab for admitting air into said cab, and a fan mounted on said bottom wall of said air passage member below said central opening in said shroud wall including means for driving said fan to draw air through said cab side wall openings into said cab in a direction transversely of said air passage member and then into said air passage member in a direction at right angles to its flow through said cab side wall openings and upward through said radiator to the exterior of said cab, said cab side wall openings providing for a transverse air flow through said cab for the equalization of wind pressure across said cab.

References Cited in the file of this patent

UNITED STATES PATENTS

| Number | Name | Date |
| --- | --- | --- |
| 1,371,178 | Ljungstrom | Mar. 8, 1921 |
| 1,513,328 | Ljungstrom | Oct. 28, 1924 |
| 1,646,659 | Page et al. | Oct. 25, 1927 |
| 1,804,334 | Guernsey | May 5, 1931 |
| 2,194,929 | Eckert | Mar. 26, 1940 |